(12) United States Patent
Haufe

(10) Patent No.: US 7,765,396 B2
(45) Date of Patent: Jul. 27, 2010

(54) DATA AUTHENTICATION METHOD AND AGENT BASED SYSTEM

(75) Inventor: Kristina Haufe, Esslingen (DE)

(73) Assignee: Alcatel, Paris (FR)

( * ) Notice: Subject to any disclaimer, the term of this patent is extended or adjusted under 35 U.S.C. 154(b) by 1308 days.

(21) Appl. No.: 11/110,707

(22) Filed: Apr. 21, 2005

(65) Prior Publication Data

US 2005/0251691 A1 Nov. 10, 2005

(30) Foreign Application Priority Data

May 7, 2004 (EP) .................................. 04360049

(51) Int. Cl.
*H04L 29/06* (2006.01)
(52) U.S. Cl. ...................................... 713/155; 713/189
(58) Field of Classification Search .................. 713/155, 713/189
See application file for complete search history.

(56) References Cited

U.S. PATENT DOCUMENTS 6,108,420 A 8/2000 Larose et al.

2001/0034841 A1* 10/2001 Shambroom ................ 713/201

FOREIGN PATENT DOCUMENTS

WO WO 01/41360 A 6/2001

OTHER PUBLICATIONS

Schneier, Applied Cryptography, 1996, John Wiley and Sons, Second edition, pp. 38-46.*
Schneier, Applied Cryptogrophy, 1996, John Wiley and Sons, Second editiion, apges 466-467.*
http://foldoc.org/user+name, page dated Oct. 19, 2009, definition dated Mar. 16, 1997.*

* cited by examiner

*Primary Examiner*—Jacob Lipman
(74) *Attorney, Agent, or Firm*—Carmen Patti Law Group, LLC

(57) ABSTRACT

This invention relates to a data authentication method for authenticating data to be sent from a first agent to a second agent in agent based systems. The invention introduces a way of signing documents without having a private key.

19 Claims, 1 Drawing Sheet

DATA AUTHENTICATION METHOD AND AGENT BASED SYSTEM

BACKGROUND OF THE INVENTION

The invention is based on a priority application EP 04360049.3 which is hereby incorporated by reference.

This invention relates to a data authentication method for authenticating data to be sent from a first agent to a second agent in an agent based system. The method is used for a fraud resistant confirmation of documents and transactions between the agents of the software system. Agent based software systems are systems that work with mobile software agents. Therefore, these systems need to consider security aspects.

An agent is a software that handles special tasks in digital networks autonomously on behalf of the user. It is comprising software code, data and a current execution state. Agents accomplish repetitive, tedious and error-prone tasks for their users. Therefore, the agent has a certain degree of intelligence and a learning aptitude. The main characteristic of mobile agents is their capability to travel through the network. They move between different platforms in order to accomplish a task for their owner. Basically, an agent based software system is a network of many computers with mobile agents migrating between those platforms.

An example for an agent based software system is proposed as a multimedia workplace of the future (MAP), which is a project initiated by the German Federal Ministry of Economics and Labor (BMWA). MAP is focused on the integration of different technologies, components and methods for multimedia interactions between a user and a computer. MAP uses intelligent systems offering assistance and supporting delegation. Several demands on aspects of mobile agent security, including protection of mobile agents against malicious hosts, are focused in MAP. The system is based on and relies on the security of the agent platform. Known software components are used to ensure that attacking agents and private data is not possible. The security methods of these software components for an agent based software system are dependent on a secure platform, meaning the hardware and the software the system is run on is considered to be safe against any kind of fraud. So all safety considerations so far are dependent on a secure platform. A confirmation of documents or transactions between agents always needs a signature in order to guarantee the document really belongs to the person who pretends to have written and/or sent it. Signing digital documents is done with a digital signature that is based on private keys. If a key belongs to exactly one person, authentication is guaranteed. Furthermore, the signature ensures integrity and non-repudiation. Problems in agent based software systems may occur in handling the private keys. Agents may migrate to malicious hosts or meet malicious agents that could steel or copy the key and thus act as a fake identity. In mobile agent systems, which are independent of a certain platform these problems arise seriously, because of the fact that the agents easily can migrate to malicious hosts or meet malicious agents which could steel or copy their private key.

SUMMARY OF THE INVENTION

It is therefore an object of the invention to provide a data authentication method and an agent based system which overcome the problems associated with the related art, in particular which introduces a way of signing documents without having a private key.

The object concerning the data authentication method is attained by the data authentication method for authenticating data to be sent from a first agent to a second agent in agent based systems, comprising the steps of generating a random key by the first agent, handing over the random key and an agent identification of the first agent to a trusted third party, saving the random key and the agent identification of the first agent by the trusted third party, creating a signature by generating a unique identifying value from said data using an identifying value creating algorithm and encrypting said unique identifying value using said random key by said first agent, sending said data and said signature and said agent identification to the second agent, receiving said data and said signature and said agent identification by said second agent, requesting said random key from said trusted third party by handing over said agent identification of the first agent received to the trusted third party by said second agent, handing over said random key from said trusted third party to said second agent, generating the unique identifying value from said data received from said first agent using said identifying value creating algorithm by said second agent, creating a decrypted signature by decrypting said signature using said random key by the second agent and authenticating said data by comparing said unique identifying value to said decrypted signature by said second agent.

The object concerning the agent based system is attained by the agent based system comprising at least a first and a second agent and a trusted third party, where said first agent is comprising random key generating means, being designed to generate a random key, and sending means being designed to hand over the random key and an agent identification of the first agent to a trusted third party and to send data and a signature and said agent identification to the second agent, and signature creating means, being designed to create said signature by generating a unique identifying value from said data using an identifying value creating algorithm and to encrypt said unique identifying value using said random key by said first agent, said trusted third party is comprising communication means, being designed to receive said random key and said agent identification and to hand over said random key to said second agent, saving means, being designed to save said random key and said agent identification of the first agent, and said second agent is comprising communication means, being designed to receive said data and said agent identification and said signature from said first agent, and to receive said random key from said trusted third party and to hand over said agent identification of the first agent received to the trusted third party, requesting means, being designed to request said random key from said trusted third party, generating means, being designed to generate the unique identifying value from said data received from said first agent using said identifying value creating algorithm, decrypting means, being designed to create a decrypted signature by decrypting said signature using said random key and authenticating means, being designed to authenticate said data by comparing said unique identifying value to said decrypted signature by said second agent.

Further advantageous features of the invention are defined in the depending claims.

The inventive data authentication method for authenticating data to be sent from a first agent to a second agent in agent based systems is comprising the steps of generating a random key by the first agent, handing over the random key and an agent identification of the first agent to a trusted third party (TC), saving the random key and the agent identification of the first agent by the trusted third party, meaning the random key is registered by the trusted third party, creating a signature by generating a unique identifying value from said data using an identifying value creating algorithm and encrypting said unique identifying value using said random key by said first agent, sending said data and said signature and said agent identification to the second agent, receiving said data and said signature and said agent identification by said second agent, requesting said random key from said trusted third party by handing over said agent identification of the first agent received to the trusted third party by said second agent, handing over said random key from said trusted third party to said second agent, generating the unique identifying value from said data received from said first agent using said identifying value creating algorithm by said second agent, creating a decrypted signature by decrypting said signature using said random key by the second agent and authenticating said data by comparing said unique identifying value to said decrypted signature by said second agent.

If the said unique identifying value and said decrypted signature are being identified as equal the data is classified as authentic, otherwise the data is believed not to be sent from the agent, meaning its owner, as pretended.

The inventive method results at least in the following advantages: Authentication, integrity and non-repudiation are warranted, the agents do not need to carry around a private key, the method is suitable for autonomous mobile agent systems independent of a certain platform, the method introduces a way of signing documents sent by agents which do not have a private key. Therefore, the inventive method introduces a completely new way of acting with mobile agents and digital signatures. The special aspect is the independence of agent platforms. It thus opens new perspectives in using autonomous mobile agents assisting certain tasks.

In another very preferred embodiment of the invention the inventive data authentication method further is comprising the steps of: generating a time stamp and saving said time stamp together with the random key and the agent identification of the first agent by said trusted third party, confirming said saving to the first agent by handing over said time stamp to the first agent, sending said time stamp together with said data from said first agent to said second agent, handing over said time stamp together with said agent identification of the first agent received to the trusted third party by said second agent, and identifying the saved random key by comparing the time stamp handed over from the second agent to the time stamp saved together with the agent identification of the first agent by the third party. Only if the time stamp handed over from the second agent to the trusted third party is equal to the time stamp saved or registered together with the random key and the agent identification of the first agent, the time stamp is classified as being valid otherwise it is classified as not being valid. Furthermore, the time stamp can be classified as not being valid, meaning it is classified as being expired, if there has passed too much time after the time stamp has been generated. If the time stamp is classified as not being valid the data can be classified as not authentic. Therefore, this preferred time stamping embodiment of the inventive method leads to a more secure system, as a random key created by an agent can be classified as being expired.

Advantageously, a trusted third party identifier is sent together with said data from said first agent to said second agent, and the second agent hands over said agent identification of the first agent received, to a trusted third party having said trusted third party identifier. The introduction of a trusted third party identifier leads to the possibility to handle a system having more than one trusted third party involved.

Preferably, said identifying value creating algorithm is a hash algorithm and said unique identifying value is the hash value of said data. To use a hash algorithm is a very well known method used for encrypting purposes. This is a safe and fast method to create a unique identifying value out of any data.

Preferably, handing over of information between said agents and said trusted third party is secured by encrypting means. Handing over information is to be understood as said handing over of said random key, said agent identification, said time stamp and/or any other data exchange of data between an agent and a trusted third party. By encrypting information, meaning data exchanged, it is secured that the inventive method cannot be cheated by stealing the random key whereas it is handed over to the trusted third party.

It is preferred to generate the agent identification of an agent by applying a protected generating algorithm by the agent. The algorithm may be based on using static data stored anywhere in the agent based system. If it is not known how to create the agent identification of an agent by third parties, it is not possible to pretend to be an agent by the third party successfully.

An inventive agent based system is comprising at least a first and a second agent and a trusted third party. The inventive agent based system is being designed to perform the steps of the inventive method. According to the invention said first agent is comprising: random key generating means, being designed to generate a random key, and sending means being designed to hand over the random key and an agent identification of the first agent to a trusted third party and to send data and a signature and said agent identification to the second agent, and signature creating means, being designed to create said signature by generating a unique identifying value from said data using an identifying value creating algorithm and to encrypt said unique identifying value using said random key by said first agent. According to the invention said trusted third party is comprising: communication means, being designed to receive said random key and said agent identification and to hand over said random key to said second agent, saving means, being designed to save said random key and said agent identification of the first agent. According to the invention said second agent is comprising: communication means, being designed to receive said data and said agent identification and said signature from said first agent, and to receive said random key from said trusted third party and to hand over said agent identification of the first agent received to the trusted third party, requesting means, being designed to request said random key from said trusted third party, generating means, being designed to generate the unique identifying value from said data received from said first agent using said identifying value creating algorithm, decrypting means, being designed to create a decrypted signature by decrypting said signature using said random key and authenticating means, being designed to authenticate said data by comparing said unique identifying value to said decrypted signature by said second agent.

The inventive agent based system is designed to perform the steps of the inventive method. Therefore it makes available the advantages being provided by the inventive method.

In a very preferred embodiment of the inventive agent based system said trusted third party is comprising time stamping means, being designed to generate a time stamp and that said saving means are being designed to save said time stamp together with the random key and the agent identification of the first agent, and said communication means of said trusted third party are being designed to confirm said saving to the first agent by handing over said time stamp to the first agent, and said sending means of said first agent are being designed to send said time stamp together with said data from said first agent to said second agent, and said communication means of said second agent are being designed to hand over said time stamp together with said agent identification of the first agent received to the trusted third party, and said trusted third party is comprising validating means, being designed to validate said time stamp by comparing the time stamp handed over from the second agent to the time stamp saved together with the agent identification of the first agent. This very preferred embodiment of the invention is an implementation of the preferred time stamping embodiment of the inventive method as described above. Therefore, it provides the advantages of the preferred time stamping embodiment.

In a further very advantageous embodiment of the invention in the agent based system, comprising at least a first and a second agent and a trusted third party, said first and said second agent and said trusted third party are comprising at least one microcomputer loaded with a computer program with software code sections by which the steps according to the inventive method are carried out. The computer program is comprising computer program means adapted to perform the steps of the inventive method when said program is run on an agent based computer system comprising a first and a second agent and a trusted third party. To implement the inventive method as a computer program is the most appropriate way to achieve the advantages of the inventive method.

The different features of the preferred embodiments of the invention may be used in combination together with the invention as set forth in the independent claims or just each single preferred embodiment together with the invention as set forth in the independent claims.

The embodiments of the invention will now be described with reference to the accompanying drawing.

Figure 1:
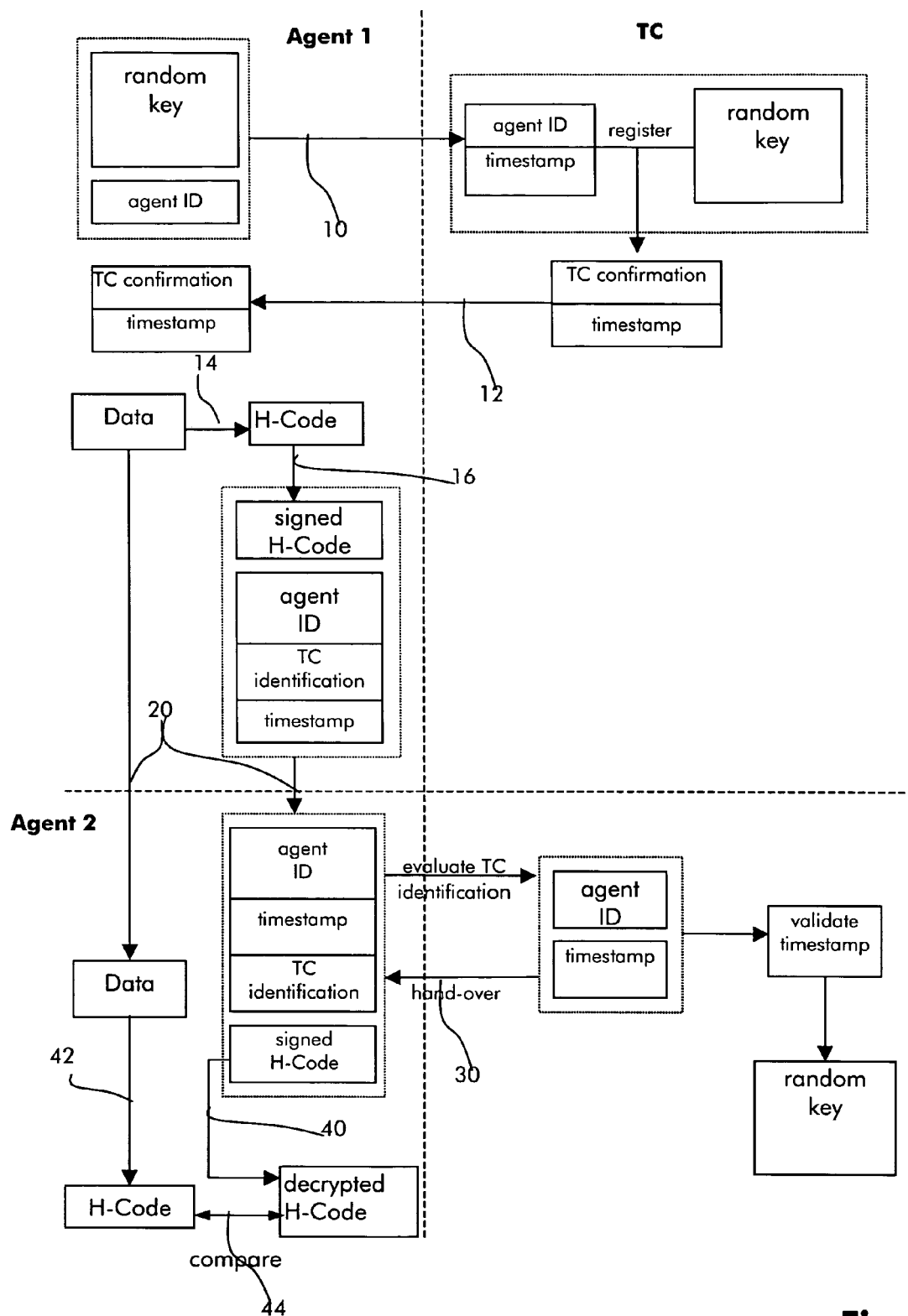
In FIG. 1 the inventive method is shown schematically. The inventive method is based on creating a random key by a first agent or source agent (Agent 1) and handing 10 the random key over to a trusted center (TC). The key is registered at a trusted third party or the trusted center (TC) that saves the key with an agent identification (ID) and a time stamp. The trusted third party is part of a computer network, in which the agents are instantiated. After receiving 12 the confirmation of the registration, the first agent can use the random key to sign documents (Doc), in general any data to be transmitted to the second agent. The first agent sends 20 the document (Data), the signature (signed H-code), its agent ID, the time stamp it received from the trusted party and an identification of the trusted third party (TC identification) to other agents, e.g. a second agent or receiving agent (Agent 2). The receiving agents can verify the signature by requesting 30 the key at the identified trusted third party with agent ID and the time stamp. The inventive method is used for digital signature and confirmation of documents (Data) and transactions in agent based software systems, in which a source agent communicates a digital signature of a document to a receiving agent. The source agent and the receiving agent also are communicating with a trusted third party (TC) via a secure communication. The communication between agents and the trusted center (TC) is secured by encryption means. As a first step a source agent (Agent 1) generates a random key and registers it at a trusted third party or trust center (TC). The trust center (TC) saves the key with the source agent ID and assigns a time stamp and confirms the registration to the source agent. The source agent (Agent 1) receives 12 the confirmation of the registration from the trusted third party (TC) with the time stamp. Now the source agent (Agent 1) uses the random key to sign documents (Data), and sends 20 said documents, the signature, its agent ID, the time stamp it received from the trusted party and an identification of the trusted center (TC) to a second agent (Agent 2) or some other agents. The signature is created by encrypting 16 a unique identifying value, derived from the documents to be sent, e.g. by calculating or creating 14 the hash value of the document. The receiving agent (Agent 2) verifies the signature by requesting the key at the identified trusted third party (TC) by providing the source agent ID and the time stamp. The requested random key is handed over 30 from the trusted third party to the receiving agent. Now the receiving agent can decrypt 40 the signature received from the second agent and authenticate 44 the received data by comparing the decrypted signature to a unique identifying value (H-code), the second agent generates 42 in the same manner as the first agent did. With this method a signature of documents and transactions can be carried out without private keys. Carrying a private key or secret data is a security risk for mobile agents as they can lose it or it might be stolen. A loss of the private key can cause big damages. Every agent of the inventive agent based system possesses a mechanism to create keys on random basis and to generate a unique agent identifier. They both might be carried out on a basis of static data. The process to generate the agent identifier is only known by the owner who specifies the mechanism and is only possible using data that is accessible exclusively. The mechanism is protected in the agent's code. Whenever the agent needs to prove its identity it can generate the agent ID. If an agent wants to accomplish a transaction or send a document, which has to be signed, it creates a random key. When a random key is created, a basic source to create the key has to be found in a way that the random key really has random characteristics. For example, this can be achieved by using a combination of any secret data and the actual time as a basis source.

After creating the key and the agent identifier, both will be sent to a Trust Center (TC). The Trust Center registers and saves the key with the agent's ID and a time stamp generated by the TC. The time stamp, e.g. is advantageous in case one agent creates several keys for different communication sessions. The random key may be only valid for one transaction or document or for one communication session with the same second agent. The TC confirms the registration by sending back a confirmation and the time stamp that is valid for that key.

The first agent now uses the key to sign a transaction or document. The first agent creates the hash value (H-code) as an unique identifying value of the Document and signs it with the random key. This signature (signed H-code) is sent together with the document (Data), the agent ID, the time stamp and the TC identification to a second agent or some other agents. Communication partners, meaning the second agent or the other agents, in case there are more agents to receive the document, can verify the signature by sending the agent ID and the time stamp to the Trust Center identified by the TC identification received. This TC looks up the random key and sends it back to the second agent or agents. The second agent now is able to verify the signature (signed H-code) using the received random key. The second agent decrypts the signature (signed H-code) received from the first agent. The result of the decryption is the hash value (H-code) generated by the first agent. Now the second agent compares the result to the hash value the second agent generates from the documents received from the first agent. With the agent ID an unambiguous assignment to the sender is possible. The signing with the random key ensures non-repudiation and integrity by comparing the hash values.

The invention claimed is:

1. A data authentication method adapted to execute on an agent based system comprising a first microcomputer having stored instructions thereon which when executed on a programmed processor perform the method steps of a first agent, a second microcomputer having stored instructions thereon which when executed on a programmed processor perform the method steps of a second agent, a third microcomputer having stored instructions thereon which when executed on a programmed processor perform the method steps of a trusted third party, the data authentication method comprising the steps of
generating a random key by the first agent,
generating a unique agent identifier by the first agent by using a static value stored in the agent based system,
handing over the random key and the unique agent identifier of the first agent to the trusted third party,
saving the random key and the unique agent identifier of the first agent by the trusted third party,
creating a signature by generating a unique identifying value from data using an identifying value creating algorithm and encrypting said unique identifying value using said random key by said first agent,
sending said data and said signature, a unique trusted third party identifier and said unique agent identifier by the first agent to the second agent,
receiving said data and said signature, the unique trusted third party identifier and said unique agent identifier by said second agent,
requesting said random key from said trusted third party by handing over said unique agent identifier of the first agent received to the trusted third party by said second agent,
handing over said random key from said trusted third party to said second agent,
generating the unique identifying value from said data received from said first agent using said identifying value creating algorithm by said second agent,
creating a decrypted signature by decrypting said signature using said random key by the second agent, and
authenticating said data by comparing said unique identifying value to said decrypted signature by said second agent wherein the first agent and second agent migrate from among a plurality of platforms.

2. The data authentication method according to claim 1, wherein the trusted third party identifier is sent together with said data from said first agent to said second agent, and the second agent hands over said unique agent identifier of the first agent received to a trusted third party having said trusted third party identifier.

3. The data authentication method according to claim 1, wherein said identifying value creating algorithm is a hash algorithm and said unique identifying value is the hash value of said data.

4. The data authentication method according to claim 1, wherein handing over of information between said agents and said trusted third party is secured by encrypting means.

5. The data authentication method according to claim 1, wherein the unique agent identifier of an agent is generated by applying by the agent a generating algorithm unknown to third parties.

6. The method of claim 1, the first agent creates the signature using a set of keys consisting of the random key; and
the second agent creates the decrypted signature with a set of keys consisting of the random key.

7. The method of claim 1 wherein requesting said random key from said trusted third party further comprises selecting said trusted third party from a plurality of trusted third parties based on the unique trusted third party identifier and requesting said random key from said selected trusted third party.

8. The method of claim 1 wherein the signature is created without the use of a private key.

9. The data authentication method according to claim 1, further comprising the steps of
generating a timestamp and saving said timestamp together with the random key and the unique agent identifier of the first agent by said trusted third party,
confirming said saving to the first agent by handing over said timestamp to the first agent,
sending said timestamp together with said data from said first agent to said second agent,
handing over said timestamp together with said unique agent identifier received from the first agent to the trusted third party by said second agent, and
identifying the saved random key by comparing the timestamp handed over from the second agent to the time stamp saved together with the unique agent identifier of the first agent by the third party.

10. The method of claim 9 wherein the first agent creates the signature after receiving said timestamp from the trusted third party.

11. A data authentication system comprising:
a data authentication agent configured to:
receive data, receive a unique trusted third party identifier receive a signature and receive a unique agent identifier;
receive a random key that is associated with the unique agent identifier;
generate a unique identifying value from the data by using an identifying value creating algorithm;
create a decrypted signature by decrypting the signature using the random key;
receive data from a plurality of mobile agents that migrate among a plurality of platforms; and
authenticating the data by comparing the unique indentifying value to the decrypted signature.

12. The method of claim 11 wherein the decrypted signature is created without the use of a private key.

13. The data authentication system of claim 11 wherein:
the data authentication system further comprises a first agent, a second agent and, a trusted third party wherein the second agent comprises the data authentication agent;
wherein the first agent is communicatively coupled with the second agent, the first agent is communicatively coupled with the trusted third party, and the second agent is communicatively coupled with the trusted third party;
the first agent is configured to generate the random key and the unique agent identifier where the agent identifier is generated using static data stored in the agent based system;
the first agent is configured to communicate the random key and the unique agent identifier to the trusted third party;
the trusted third party is configured to receive and store the random key and the unique agent identifier where the random key is associated with the unique agent identifier,
the first agent is configured to create a signature by generating a unique indentifying value from the data by using an identifying value creating algorithm and the first agent is configured to encrypt the unique identifying value using the random key;

the first agent is configured to send the data, the unique trusted third party identifier, the signature and the unique agent identifier to the second agent;

the trusted third party is configured to access the random key based on the unique agent identifier sent by the second agent, and the trusted third party is configured to communicate the accessed random key to the second agent; and the second agent is configured to create the decrypted signature from the random key.

14. The data authentication system of claim 13 wherein a trusted third party identifier is communicated with the data from the first agent to the second agent, and the second agent communicates the unique agent identifier of the first agent to a trusted third party having the trusted third party identifier.

15. The data authentication system of claim 13 wherein:

the identifying value creating algorithm is a hash algorithm and the unique identifying value is the hash value of the data;

the first agent creates the signature using a set of keys consisting of the random key; and the second agent creates the decrypted signature with a set of keys consisting of the random key.

16. The data authentication system of claim 13 wherein communication of information amongst the first agent, the second agent and the trusted third party is secured by encryption.

17. The data authentication system of claim 13 wherein the unique agent identifier of an agent is generated by applying by the agent a generating algorithm unknown to third parties.

18. The data authentication system of claim 13, wherein the trusted third party is further configured to generate a timestamp upon receipt of the random key and unique agent identifier and the trusted third party is configured to store the timestamp, the random key and the unique agent identifier;

the trusted third party confirms storing the time stamp by communicating the time stamp to the first agent in a response to the first agent communicating the random key and the unique agent identifier;

the first agent is configured to communicate the time stamp and the data to the second agent; and the second agent is configured to communicate the timestamp and the unique agent identifier to the trusted third party and in response thereto, the trusted third party is configured to access the saved random key by comparing the timestamp communicated from the second agent to the time stamp saved together with the agent identifier.

19. The method of claim 18 wherein the first agent creates the signature after receiving the timestamp from the trusted third party.

* * * * *